United States Patent [19]
Furahashi et al.

[11] Patent Number: 5,315,677
[45] Date of Patent: May 24, 1994

[54] OPTICAL PULSE GENERATOR

[75] Inventors: Masaaki Furahashi; Ryoji Handa, both of Tokyo, Japan

[73] Assignee: Ando Electric Co., Ltd., Tokyo, Japan

[21] Appl. No.: 118,766

[22] Filed: Sep. 10, 1993

[30] Foreign Application Priority Data

Sep. 14, 1992 [JP] Japan .................................. 4-270893

[51] Int. Cl.$^5$ .............................................. G02B 6/34
[52] U.S. Cl. ....................................... 385/37; 385/23; 385/27; 385/31
[58] Field of Search .................... 385/1, 4, 16, 23, 27, 385/31, 37, 38, 39, 50

[56] References Cited

U.S. PATENT DOCUMENTS

| | | | |
|---|---|---|---|
| 4,497,535 | 2/1985 | Winful et al. | 385/1 |
| 4,741,587 | 5/1988 | Jewell et al. | 385/1 |
| 4,768,853 | 9/1988 | Bhagavatula | 385/31 |
| 5,181,213 | 1/1993 | Shinokura et al. | 385/38 X |

*Primary Examiner*—John D. Lee
*Attorney, Agent, or Firm*—Finnegan, Henderson, Farabow, Garrett & Dunner

[57] ABSTRACT

An optical pulse generator comprises a signal source, an excitation light source, a first optical fibre, a first lens, a diffraction grating, a second lens, a second optical fibre and an optical switch. Herein, signal beams produced form the signal source are transmitted through the first optical fibre, first lens, diffraction grating and second lens in turn, so that a signal beam having a desired wavelength is selectively outputted. This signal beam is converged onto and is incident to a terminal portion of the second optical fibre which is excited by an excitation beam produced from the excitation light source. Under an operation of the optical switch, the terminal portion of the second optical fibre is vibrated, resulting that an optical path to be formed between the first optical fibre and the second optical fibre is periodically opened or closed. Thus, an optical pulse of which amplitude is controlled and of which pulse width is also desirably controlled is outputted form the second optical fibre. Preferably, the second optical fibre is made of a predetermined material including a rare-earth material.

4 Claims, 5 Drawing Sheets

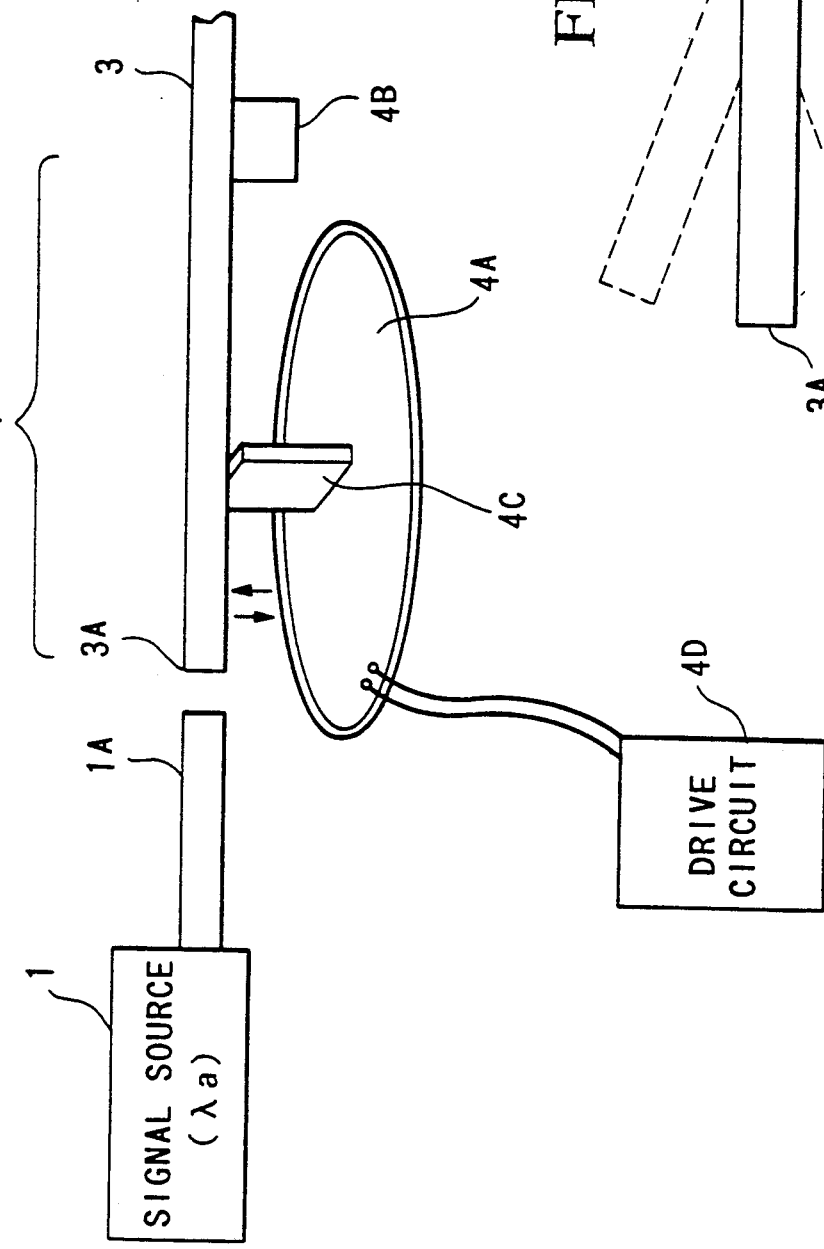
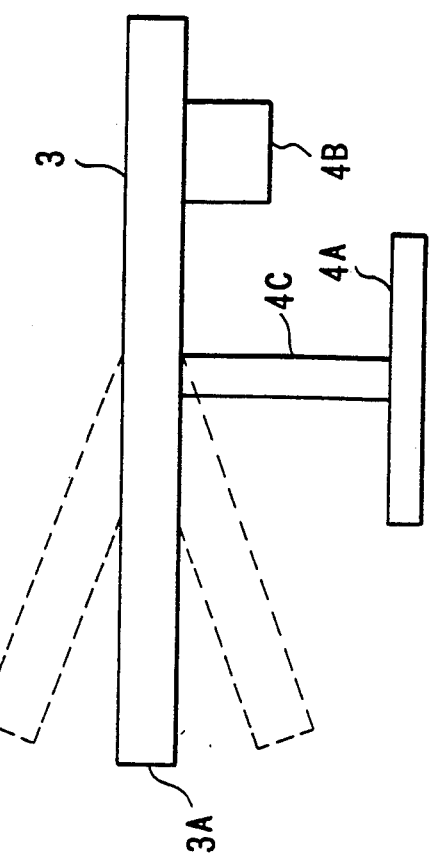

OPTICAL PULSE GENERATOR

BACKGROUND OF THE INVENTION

The present invention relates to an optical pulse generator which can selectively change a wavelength of an optical pulse signal.

In a general-use optical pulse generator, an optical fibre made of a predetermined material added with a rare-earth material is vibrated by a displacement element such as a piezoelectric element so as to open and close an optical path provided for an optical signal, so that an optical pulse signal is generated.

FIG. 3 is a drawing showing an electric configuration of an example of the optical pulse generator. In FIG. 3, a numeral 1 designates a signal source having a wavelength $\lambda_a$, while a numeral 2 designates an excitation light source having another wavelength $\lambda_b$; 3 designates an optical fibre added with the rare-earth material; 4 designates an optical switch; 5 designates a wave divider; 7 designates a wave divider/mixer; 8A and 8E designate lenses; and 9 designates a slit plate. In the optical pulse generator shown in FIG. 3, a predetermined wavelength is selected for a signal beam by the wave divider 5, and then, an amplitude of the pulse-like signal beam is enlarged (in other words, the optical pulse signal is amplified).

In general, the optical pulse is defined as a light which is radiated for a short period of time. This optical pulse has a pulse like waveshape having a peak level. Normally, a pulse width for the optical pulse is defined as a period of time in which an amplitude level of the optical pulse is approximately higher than a half of the peak level. Thus, the waveshape of the optical pulse can be defined by use of the peak level and the pulse width.

Now, the wave divider S removes unnecessary wavelength components from the signal beam produced from the signal source 1 so as to only pass a signal component having the wavelength $\lambda_a$ therethrough. On the other hand the wave divider/mixer 7 introduces the excitation beam having the wavelength $\lambda_b$, produced from the excitation light source 2, to the optical fibre 3 so as to excite the optical fibre 3. By driving the optical switch 4. The optical path provided between the signal source 1 and the optical fibre 3 is opened for a short period of time. In such short period of time. The signal beam outputted from the signal source 1 is introduced into the optical fibre S wherein it is amplified. Then, the signal beam amplified is passed through the wave divider/mixer 7 from which it is outputted as an output beam.

Next, a configuration and an operation of the optical switch 4 will be described in detail by referring to FIG. 4. In FIG. 4. a numeral 1A designates an optical fibre which introduces the signal beam outputted from the signal source 1; 3A designates a terminal portion of the aforementioned optical fibre S made of the predetermined material including the rare-earth material; 4A designates a displacement element; 4B designates a fulcrum point; 4C designates a transmission plate; and 4D designates a drive circuit. These elements 4A to 4D are assembled together to form the optical switch 4.

The displacement element 4A is vibrated when being driven. As the displacement element 4A, it is possible to employ an piezoelectric element, a tuning-fork vibrator, a quartz oscillator and the like. The terminal portion 3A of the optical fibre 3 is formed as a free terminal, while the optical fibre 3 itself is supported at the fulcrum point 4B. The transmission plate 4C transmits a vibration caused by the displacement element 4A to a certain part of the optical fibre 3 which is existed between the terminal portion 3A and the fulcrum point 4B.

In FIG. 4. The optical fibre 4 is located to face with the terminal portion 3A of the optical fibre S. Then, by vibrating the optical fibre 3. An optical path between the optical fibres 1A and 3 is opened or closed.

Next, a vibrating state of the terminal portion 3A of the optical fibre 3 will be described by referring to FIG. 5. For example a distance between the terminal portion 3A and the fulcrum point 4B is set at 1 cm. It can be observed from FIG. 5 that a vibrating pitch of the terminal portion 3A of the optical fibre 3 is larger than that of the transmission plate 4C. If a core diameter of the optical fibre 1A is 10 $\mu$m, by vibrating the terminal portion 3A of the optical fibre 3 with a vibrating pitch of 10$\mu$m or more, it is possible to open and close the optical path between the optical fibres 1A and 3.

Next a construction of the slit plate 9 shown in FIG. 3 will be described in detail by referring to FIG. 6. Under beams are converged on a crossing point at which location the slit plate 0 having a slit 9A is located. For example, an opening interval of the slit 9A is set at 10$\mu$m.

The lens 8E and the optical fibre 3 are arranged such that when the displacement of the displacement element 4A is equal to zero. The lens 8E is located to be connected with the optical fibre 3. The slit plate 0 shuts off any light components other than the signal beam. As the signal beam, a pulse-like beam or a continuous beam can be employed if its width is larger than a pulse width of the signal beam to be amplified.

When the displacement is equal to zero, an amplitude of the signal beam (i.e.. optical pulse signal) reaches the peak; while as the displacement becomes larger. The amplitude of the signal beam becomes lower. If a pulse width of the signal beam to be inputted into the optical fibre 3 is smaller than an optical-connection period in which lens 8E and the terminal portion 3A is optically connected it is difficult to control the pulse width (or wavelength) of the signal beam to be outputted. However if the pulse width of the signal beam is larger than the above optical-connection period, it is possible to control the pulse width of the signal beam to be outputted from the optical fibre 3. For this reason, it is necessary to select the pulse width of the signal beam inputted larger than the above optical-connection period. Thus it is possible to employ the continuous light as the signal beam inputted because its pulse width is very large.

Meanwhile the pulse width of the signal beam to be amplified depends on a time at which the displacement of the displacement element 4A is set at zero. Because, as described before when the displacement of the displacement element 4A is zero. The amplitude of the signal beam outputted reaches the peak. While the pulse width of the signal beam is determined responsive to the amplitude level.

Incidentally the drawings shown in FIGS. 3, 4, 5 and 6 are identical to FIGS. 6, 1, 2 and 3 attached with the specification of the Japanese Patent Application No. 4-179242 whose filing date is Jun. 12, 1992. Of course, this application has not been published in Japan.

By the way, the wave divider 5 shown in FIG. 3 is designed to selectively pass the signal beam having a specific wavelength only. Thus, there is a problem in that the wavelength of the signal beam outputted cannot be arbitrarily altered.

SUMMARY OF THE INVENTION

It is accordingly a primary object of the present invention to provide an optical pulse generator which can arbitrarily alter the wavelength of the signal beam.

According to a configuration of the optical pulse generator as defined by the present invention, there are provided a signal source. An excitation light source, a first optical fibre, a first lens, a diffraction grating, a second lens, a second optical fibre and an optical switch.

In the above-mentioned configuration, signal beams produced from the signal source are transmitted through the first optical fibre first lens, diffraction grating and second lens in turn, so that a signal beam having a desired wavelength is selectively outputted. This signal beam is converged onto and is incident to a terminal portion of the second optical fibre which is excited by an excitation beam produced from the excitation light source. Under an operation of the optical switch the terminal portion of the second optical fibre is vibrated, resulting that an optical path to be formed between the first optical fibre and the second optical fibre is periodically opened or closed. Thus, An optical pulse is amplified and is outputted from the second optical fibre. Preferably the second optical fibre is made of a predetermined material including a rare-earth material.

BRIEF DESCRIPTION OF THE DRAWINGS

Further objects and advantages of the present invention will be apparent from the following description, reference being had to the accompanying drawings wherein the preferred embodiment of the present invention is clearly shown.

In the drawings:

FIG. 4 is a drawing showing an essential part of the optical pulse generator shown in FIG. 3;

FIG. 5 is a drawing which is used for explaining a vibrating motion of the optical fibre.

DESCRIPTION OF THE PREFERRED EMBODIMENT

Next. An optical pulse generator according to an embodiment of the present invention will be described in conjunction with FIGS. 1 and 2.

Figure 1:
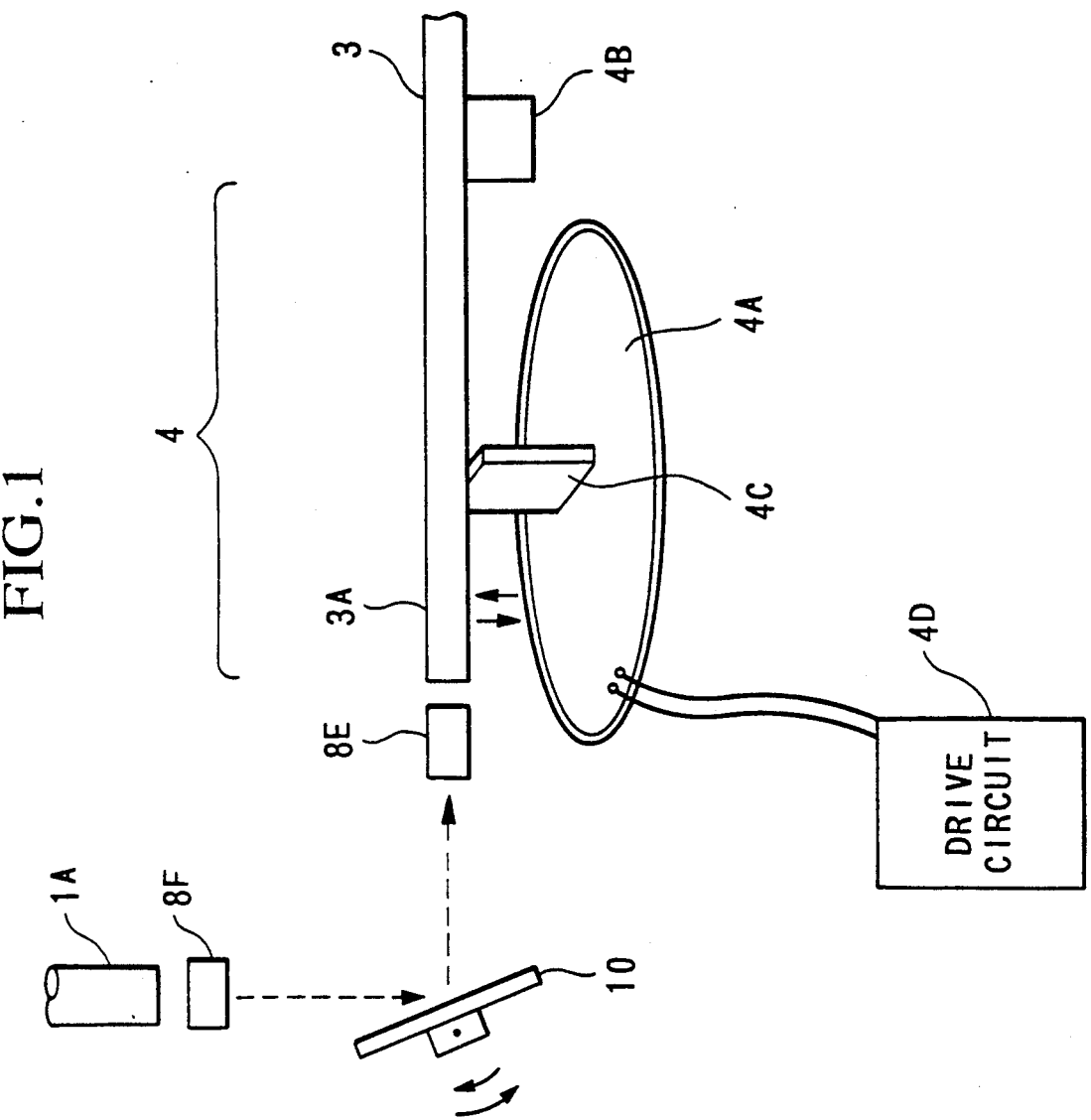
FIG. 1 is a drawing showing an essential part of an optical pulse generator according to an embodiment of the present invention.
Figure 3:
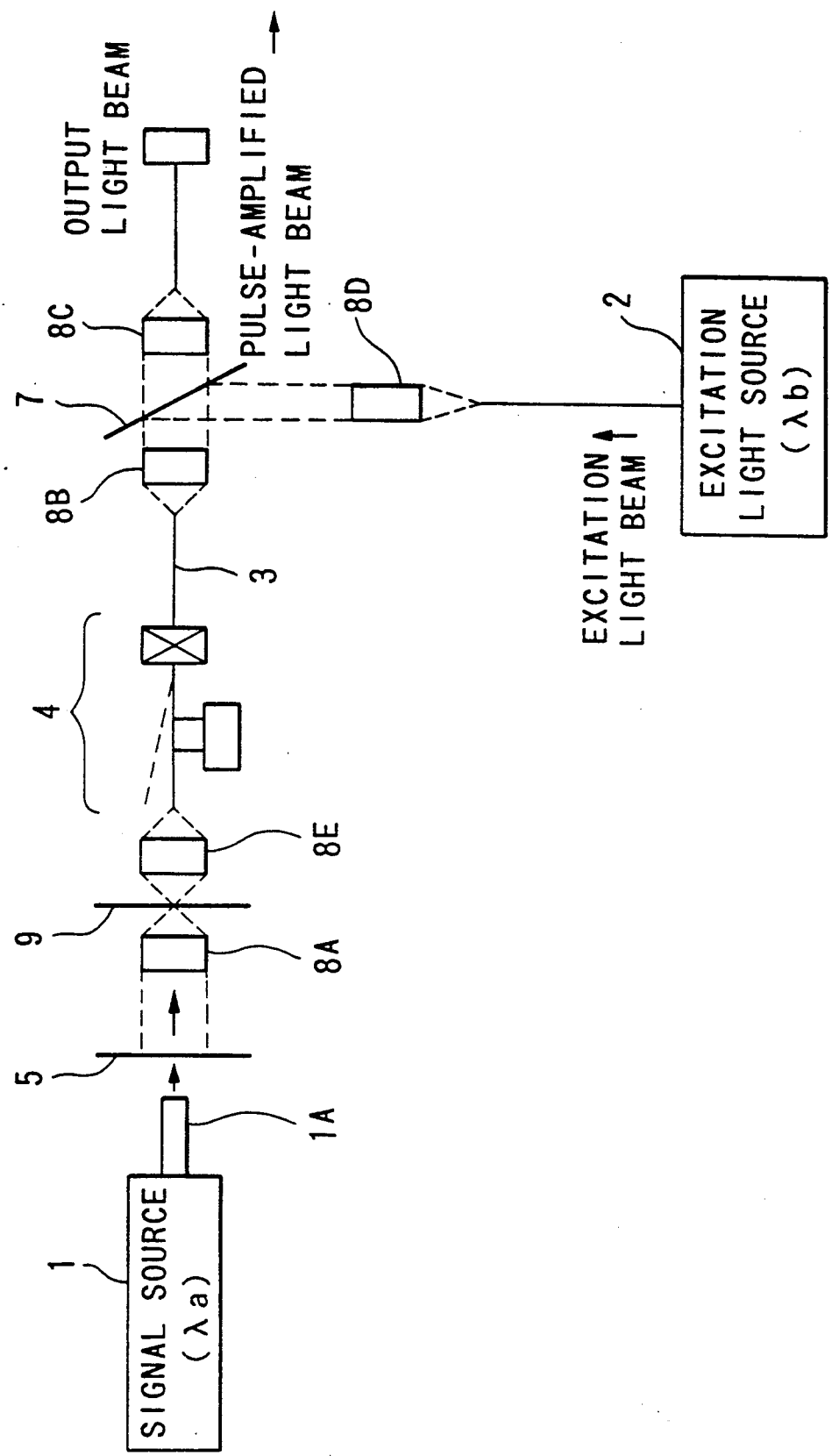
FIG. 3 is a drawing showing an example of the optical pulse generator.

FIG. 1 is a drawing showing an essential part of the optical pulse generator according to an embodiment of the present invention. Different from the aforementioned configuration of the optical pulse generator shown in FIG. 6, this optical pulse generator shown in FIG. 1 further provides a lens 8F and a diffraction grating 10. The lens 8F is located close to an edge portion of the optical fibre 1A so that the signal beam produced from the signal source 1 is incident to the lens 8F through the optical fibre 1A. The diffraction grating 10 is located apart from and in connection with the lens 8F so that the signal beam passing through the lens 8F is diffracted by the diffraction grating 10. Thus, the signal beam diffracted is converged by the lens 8E. from which the signal beam is incident to the terminal portion 3A of the optical fibre S. The other elements shown in FIG. 1 are identical to those shown in FIG. 3; hence. The detailed description thereof will be omitted. In short a pair of the lens 8A and the slit plate 0 shown in FIG. 0 are replaced by a pair of the lens 8F and the diffraction grating 10 shown in FIG. 1. The lenses 8F and 8E function to convert the light beams into parallel light beams.

The lens 8E and the optical fibre 3 are arranged such that when the displacement of the displacement element 4A is zero. they are optically connected with each other. In FIG. 1, the light beams other than the signal beam having a selected wavelength are removed by the lens 8E so that they are not incident to the optical fibre S. As described before as the signal beam the pulse-like light beam or the continuous light beam can be employed if its pulse width is larger than the pulse width of the signal beam to be amplified. In addition. The pulse width of the signal beam to be amplified depends upon the time at which the displacement of the displacement element 4A becomes equal to zero.

Figure 2:
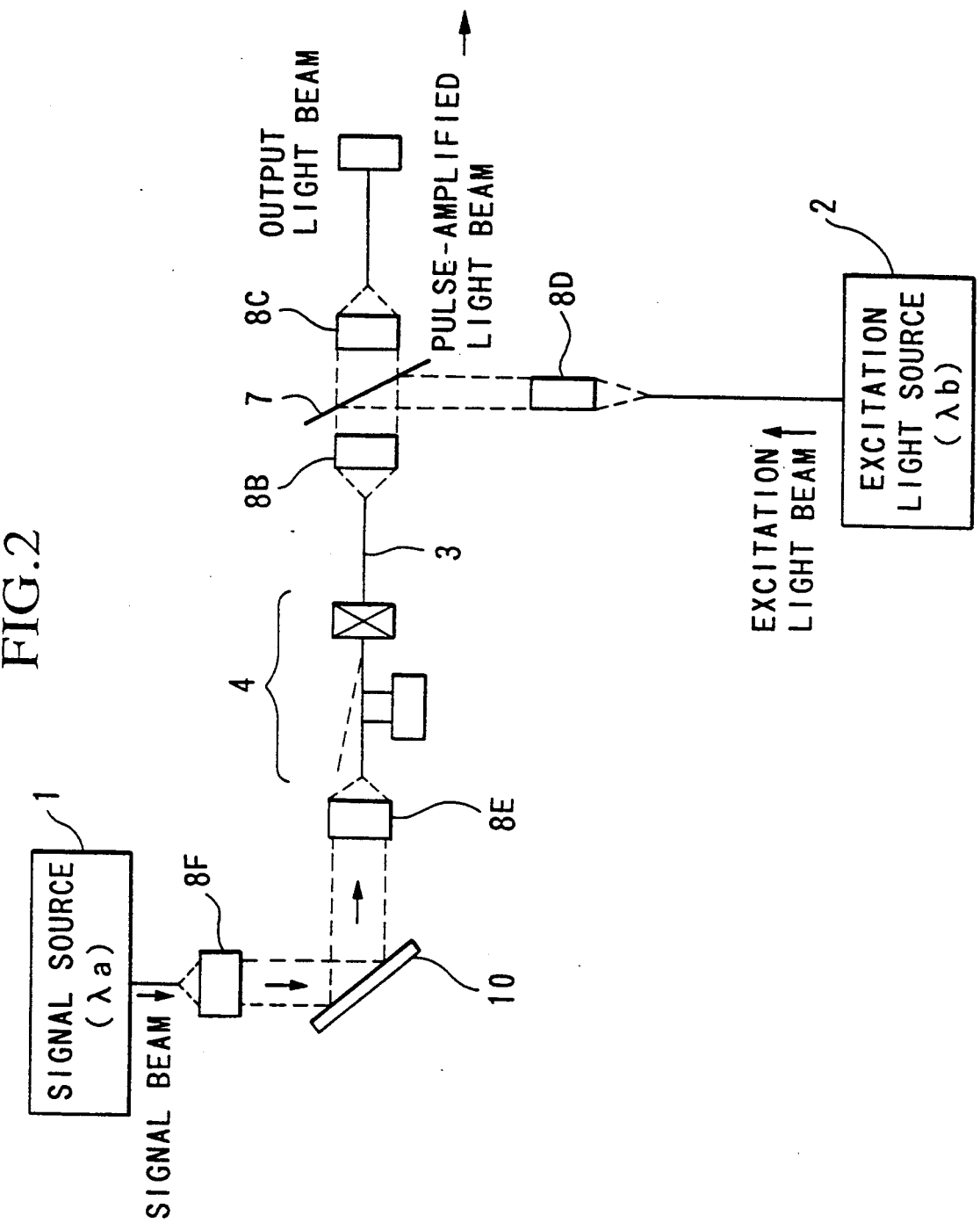
FIG. 2 is a drawing showing a whole configuration of the optical pulse generator according to an embodiment of the present invention.

FIG. 2 is a drawing showing a whole configuration of the optical pulse generator in which the configuration shown in FIG. 1 is incorporated. In FIG. 2, the wavelength $\lambda_a$ of the signal beam outputted from the signal source 1 is approximately set at 1.55μm, whiled the wavelength $\lambda_b$ of the excitation beam produced from the excitation light source 2 is set at 1.48μm, for example.

According to the present embodiment described heretofore it is possible to exactly extract the signal beam having a desired wavelength so that the signal beam can be arbitrarily amplified by controlling a short period of time in which the optical switch 4 is opened.

Lastly this invention may be practiced or embodied in still other ways without departing from the spirit or essential character thereof as described heretofore. Therefore. The preferred embodiment described herein is illustrative and not restrictive. The scope of the invention being indicated by the appended claims and all variations which come within the meaning of the claims arc intended to be embraced therein.

WHAT IS CLAIMED IS:

1. An optical pulse generator comprising:
    a signal source for producing a signal beam having a first wavelength;
    an excitation light source for producing an excitation beam having a second wavelength;
    a first optical fibre for inputting and transmitting said signal beam radiated from said signal source;
    a first lens for transmitting said signal beam outputted from said first optical fibre;
    a diffraction grating for diffracting said signal beam transmitted thereto through said first lens;
    a second lens for converging said signal beam diffracted by said diffraction grating;
    a second optical fibre having a terminal portion, said signal beam diffracted by said diffraction grating being converged onto and being incident to said terminal portion of said second optical fibre by said second lens; and an optical switch for alternatively opening or closing an optical path to be formed between said first optical fibre and said second optical fibre, whereby said second optical fibre is excited by said excitation beam outputted from said excitation light source, while under an operation of said optical switch, said optical path formed between said first optical fibre and said second optical fibre is opened or closed by vibrating said terminal portion of said second optical fibre so that said second optical fibre eventually outputs an optical pulse of which pulse width is amplified.

2. An optical pulse generator as defined in claim 1 wherein said optical switch comprises a displacement element, a supporting means, a transmission plate and a drive circuit, said supporting means supporting a predetermined position of said second optical fibre, said displacement element being vibrated when being driven by said drive circuit. so that a vibration of said displacement element is transmitted to a predetermined portion of said second optical fibre, which exists between said terminal portion and said predetermined position supported by said supporting means, by means of said transmission plate. whereby said predetermined portion of said second optical fibre including said terminal portion is vibrated so that said optical path between said first optical fibre and said second optical fibre is periodically opened or closed.

3. An optical pulse generator as defined in claim 2 wherein said displacement element is a peizoelectric element.

4. An optical pulse generator as defined in claim 1 wherein said second optical fibre is made of a predetermined material at least including a rare-earth material.

* * * * *

UNITED STATES PATENT AND TRADEMARK OFFICE
CERTIFICATE OF CORRECTION

PATENT NO. : 5,315,677
DATED : May 24, 1994
INVENTOR(S) : Masaaki FURUHASHI

It is certified that error appears in the above-indentified patent and that said Letters Patent is hereby corrected as shown below:

TITLE PAGE

Under item [19], "Furahashi" should be corrected to tead --Furuhashi--.
Item [75], "Masaaki Furahashi", should be corrected to read -- Masaaki Furuhashi --.

Item [57], line 5, "form", should be corrected to read -- from --;
line 16, "of which", should be corrected to read -- whose --;
line 17, "of which", should be corrected to read -- whose --;
line 18, "form", should be corrected to read -- from --.

Column 1, line 30, "pulse like", should be corrected to read -- pulse-like --;
line 40, after "hand", insert -- , --;
line 48, "S", should be corrected to read -- 3 --;
line 56, "S", should be corrected to read -- 3 --.

Figure 6:
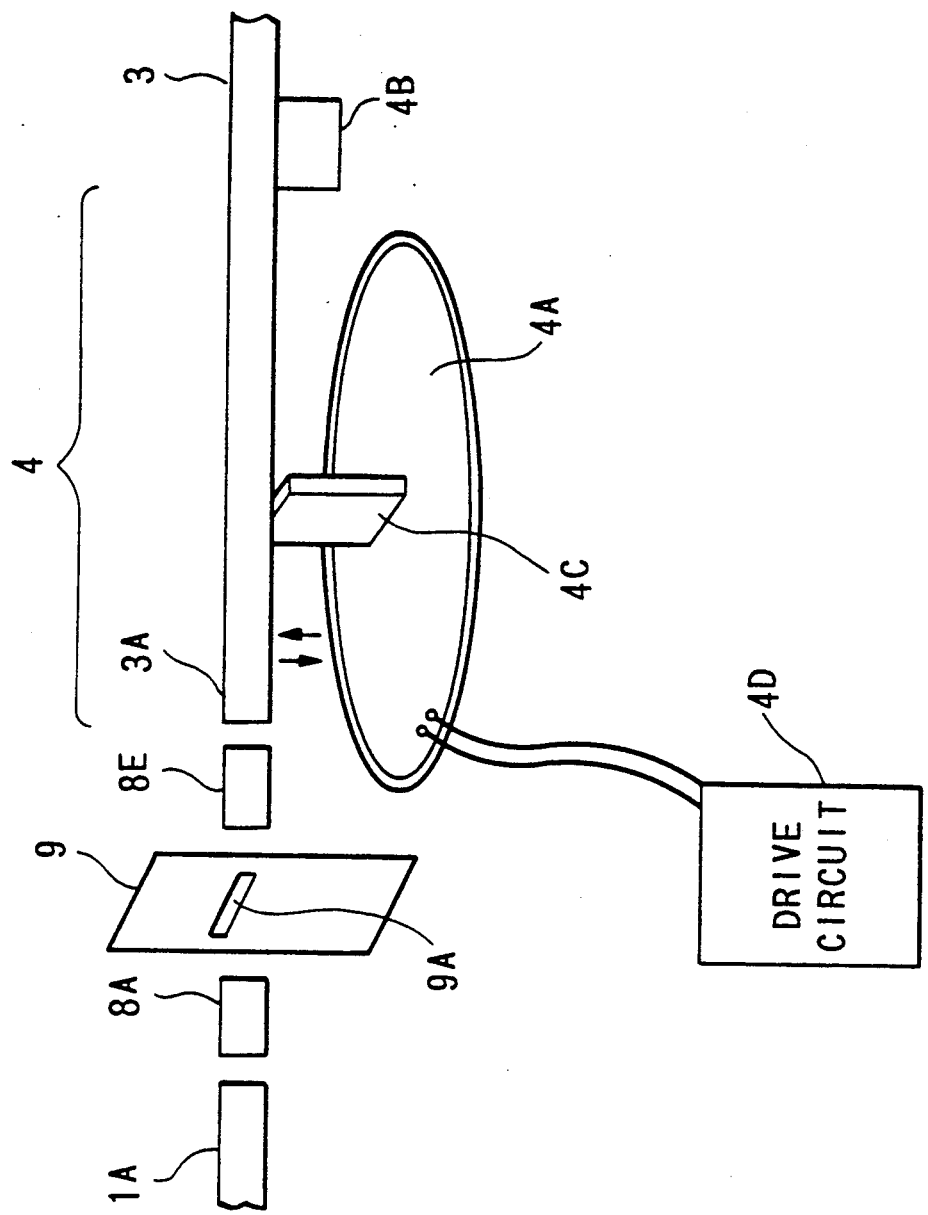
FIG. 6 is a drawing showing another example of the essential part of the optical pulse generator utilizing a slit plate.

Column 2, line 5, "S", should be corrected to read -- 3 --;
line 22, after "Under", insert -- operations of the lenses 8A and 8E shown in FIG. 6, the light --;
line 29, "O", should be corrected to read -- 9 --.

UNITED STATES PATENT AND TRADEMARK OFFICE
CERTIFICATE OF CORRECTION

PATENT NO. : 5,315,677
DATED : May 24, 1994
INVENTOR(S) : Masaaki FURUHASHI

It is certified that error appears in the above-indentified patent and that said Letters Patent is hereby corrected as shown below:

Column 4, line 6, "S", should be corrected to read -- 3 --;
line 9, "0", should be corrected to read -- 9 --;
line 10, "0", should be corrected to read -- 6 --;
line 20, "S", should be corrected to read -- 3 --;
line 23, "In addition. The", should be corrected to read -- In addition, the --;
line 44, "Therefore. The", should be corrected to read -- Therefore, the --;
line 48, "arc", should be corrected to read -- are --.

Claim 1, column 5, lines 11 and 12, "of which", should be corrected to read -- whose --.

Signed and Sealed this

Thirteenth Day of September, 1994

Attest:

BRUCE LEHMAN

*Attesting Officer*   *Commissioner of Patents and Trademarks*